United States Patent [19]

Iwasaki

[11] Patent Number: 4,671,971
[45] Date of Patent: Jun. 9, 1987

[54] PROCESS FOR MANUFACTURING A MAGNETIC RECORDING MEDIUM

[75] Inventor: Kazuharu Iwasaki, 405, Katsuragawa-kopo, No. 6-68, 3-chome, Kamisugi, Sendai-Shi, Miyagi-ken, Japan

[73] Assignees: Research Development Corporation of Japan, Tokyo; Kazuharu Iwasaki, Miyagi, both of Japan

[21] Appl. No.: 826,041

[22] Filed: Feb. 4, 1986

[30] Foreign Application Priority Data

Feb. 5, 1985 [JP] Japan ................. 60-19282

[51] Int. Cl.$^4$ ............................. H01F 10/02
[52] U.S. Cl. .................... 427/128; 427/132; 427/255.2; 427/255.6
[58] Field of Search ............ 427/128, 132, 255.2, 427/255.6

[56] References Cited

U.S. PATENT DOCUMENTS 4,260,466 4/1981 Shirahata et al. ............... 427/132 X Primary Examiner—Bernard D. Pianalto
Attorney, Agent, or Firm—Armstrong, Nikaido, Marmelstein & Kubovcik

[57] ABSTRACT

A process for manufacturing a magnetic recording medium comprising a composite film of an organic polymer and a ferromagnetic substance deposited on a non-magnetic support using a multicomponent simultaneous vapor deposition process. An incident beam of the organic polymer is irradiated on the support at an incident angle in the range of $60° < \psi_1 \leq 90°$ C. while an incident beam of the ferromagnetic substance is irradiated thereon so as not to overlap the incident beam of the organinc polymer and the incident direction of the magnetic substance in relation to the incident direction of the organic polymer is selectively set to form a high density magnetic recording medium having an improved magnetic property and having a magnetic anisotropy in a direction either perpendicular to or parallel to the surface of the magnetic film.

8 Claims, 4 Drawing Figures

TRANSMISSION ELECTRON MICROGRAPH OF THE
CROSS-SECTIONAL STRUCTURE IN CO-POLYETHYLENE
TEREPHTHALATE COMPOSITE FILM.

4,671,971

PROCESS FOR MANUFACTURING A MAGNETIC RECORDING MEDIUM

BACKGROUND OF THE INVENTION

1. Field of the Invention

This invention relates to a process for manufacturing a magnetic recording medium, and more particularly to a process for manufacturing a magnetic recording medium wherein a magnetic thin film is formed by a multi-component simultaneous vapor deposition process.

2. Description of the Prior art

For the manufacture of a conventional magnetic recording medium, a process using a particulate coating medium has been widely employed. This type is manufactured by a process in which acicular-shaped magnetic powders and an organic binder are mixed together in an organic solvent to produce a magnetic paint, or coating, including the magnetic powders well dispersed therein, and this paint is applied to a non-magnetic substrate to form a coated film and, following magnetic orientation, the coated film is dried.

More recently, there may be mentioned a ferromagnetic metal thin film medium which is being put to practical use to comply with a demand for high density recordings. This type is manufactured by a process in which a ferro-magnetic metal thin film is formed on a non-magnetic substrate by a wet plating technique or a physical vapor deposition technique such as vapor deposition, ion plating, sputtering, etc. Typical examples of this recording medium are a magnetic recording medium for longitudinal mode magnetic recording comprising a magnetic layer composed essentially of a ferromagnetic metal such as Co, Fe, Ni, etc., and a magnetic recording medium for perpendicular mode magnetic recording comprising a magnetic layer composed essentially of a Co-Cr alloy.

Further, for the purpose of improving this ferromagnetic metal thin film recording medium, there has been reported a process in which an organic polymer is deposited on the magnetic thin film thereof for forming a protective layer or a lubricating layer.

Furthermore, there has been reported a process in which a ferromagnetic substance and an organic polymer or an organic lubricant are simultaneously deposited on a support by a simultaneous vapor deposition process to form a magnetic recording layer (U.S. Pat. No. 4,260,466 and U.S. Pat. No. 4,476,195).

With respect to the particulate coating magnetic recording medium which has been widely employed, improved performance thereof has been made possible by development of acicular-shaped magnetic powders, also in response to the demand for higher recording density in recent years. However, this technique is defective in that it is difficult to make the thickness of the magnetic layer thin, because a decrease in the thickness thereof is limited in terms of saturation magnetic flux density and reproduced output. Thus, the improvement in the recording density thereof is limited. It is clear, therefore, that this type is not suitable for a high density magnetic recording medium.

Additionally, the particulate type magnetic recording medium involves such disadvantages that the manufacturing process thereof is complicated, and manufacturing facilities and associated facilities such as apparatus for treatment of organic solvent, magnetic powders and organic chemicals or the like, which are essential for the manufacturing process and for recovery of the organic solvent, are extensive and require high costs.

With respect to the ferromagnetic metal thin film medium typically represented by a magnetic tape prepared by a vapor deposition process, because a non-magnetic material is not contained in the magnetic layer thereof, the saturation magnetic flux density can be increased. Also, because it is possible to decrease the thickness of the magnetic layer, which is necessary for high density recording, increasing of the recording density can be achieved.

However, this type of magnetic recording medium is defective in that the adhesion strength of the ferromagnetic thin film to the non-magnetic substrate is so weak that, during running of the medium at a high speed, the magnetic film layer is liable to suffer mechanical deterioration such as damage, peeling or the like caused by the running system such as a magnetic head, a drum or the like. Additionally, this type of magnetic recording medium is liable to suffer from corrosion or the like, because the magnetic layer thereof is inferior in environmental stability. Thus, this type of magnetic recording medium is difficult to put to practical use as a recording medium because it is defective in mechanical durability and chemical corrosion resistance as mentioned above.

With respect to the foregoing process for improving the foregoing defects, an organic polymer is deposited on the magnetic thin film to form a protective layer. The resultant magnetic medium is defective, however, in that there is a spacing loss caused in the course of recording and reproduction by the protecting layer which has a comparatively large thickness. Degradation in recording and reproduction results.

Regarding the foregoing process for manufacturing a magnetic recording medium for longitudinal mode recording by a simultaneous vapor deposition process as disclosed in the foregoing U.S. patents, the resultant composite film of the ferromagnetic substance and the polymer is defective in that it contributes little to a shape magnetic anisotropy resulted from its film structure. Consequently, the in-plane magnetic anisotropy is weak, and also the squareness ratio and the coercive force in the longitudinal direction are small.

These defects result in a lowering of reproduced output and sensitivity, and thus the product is not suitable for practical use as a magnetic recording medium. Through investigation of the cause of these defects it has been determined according to the present invention that the defects result from the fact that the organic polymer is deposited on the substrate at a normal incidence or at an oblique incidence of a low incident angle.

In the course of the research to reach the present invention, it has been found that an incident angle of an incident beam of polymer to a substrate is important. Namely, in manufacturing a magnetic recording medium, it is essential that an incident beam of polymer is irradiated on the surface of the substrate by an oblique incidence of high incident angle. This gives a large magnetic anisotropy to a composite film, and makes it possible to obtain a thin film medium having a useful and practical magnetic property.

Thus, by the foregoing conventional processes, it has been impossible to provide a magnetic recording medium which has a fully satisfactory high magnetic property, in addition to improved mechanical durability and improved chemical corrosion resistance. As mentioned above, even by a conventional simultaneous vapor deposition process, the resultant composite film of the ferromagnetic substance and the polymer is such that it contributes only little to a shape magnetic anisotropy, and is small in coercive force and squareness ratio. Consequently, such a magnetic recording medium as above is not sufficient in reproduced output and sensitivity, and is not of practical use.

SUMMARY OF THE INVENTION

It is an object of this invention to provide a process for manufacturing a magnetic recording medium which avoids the foregoing conventional problems, and to provide a process for manufacturing a magnetic recording medium comprising a dual vapor deposition process in which the incident beams of an organic polymer and a ferromagnetic substance are simultaneously irradiated on a surface of a substrate. The process is characterized in that an incident beam of the organic polymer is irradiated on the surface of the substrate at any desired incident angle $\psi_1$ in the range of $60° < \psi_1 90°$, and at the same time an incident beam of the ferromagnetic substance is irradiated on the surface of the substrate so as not to overlap the incident beam of the organic polymer so that a composite thin film of the ferromagnetic substance and the organic polymer may be formed on the surface of the substrate.

DETAILED DESCRIPTION OF THE INVENTION

The present invention will be explained in further detail with reference to the accompanying drawings.

Figure 1:
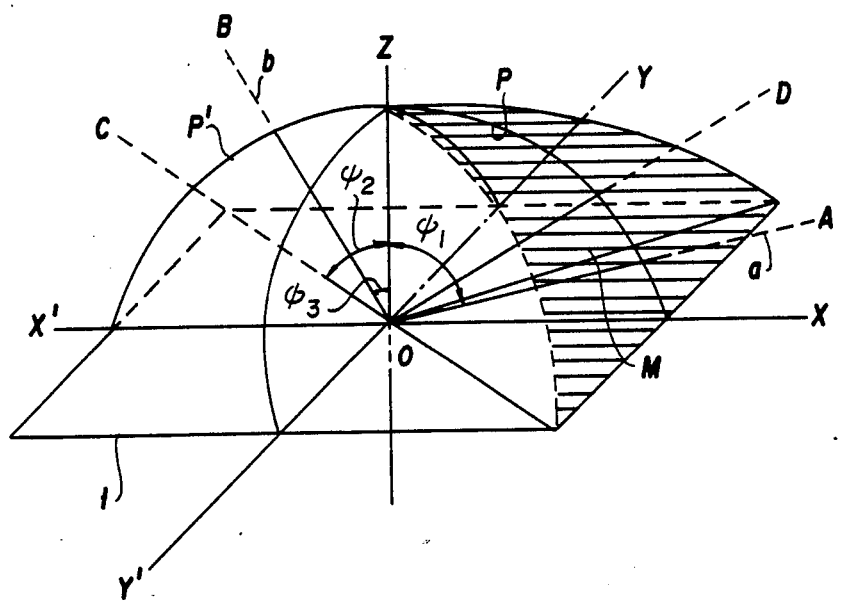
FIG. 1 is a perspective view schematically explaining an embodiment of the manufacturing process of this invention.
Figure 2:
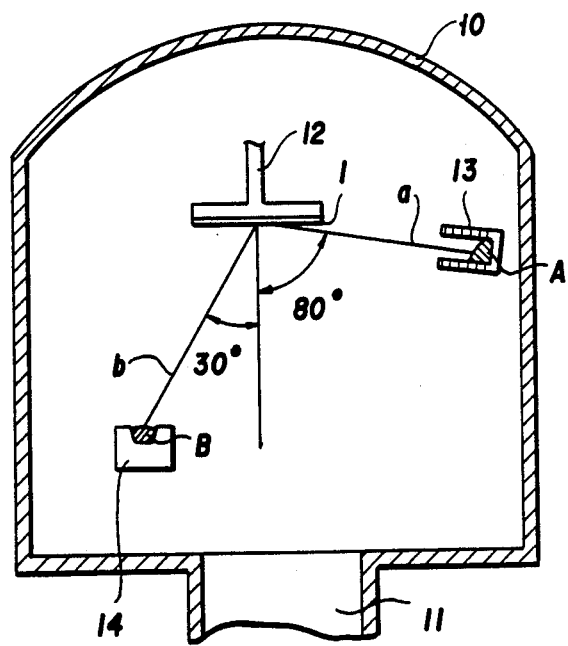
FIG. 2 is a sectional view of a manufacturing apparatus for carrying out the present invention.

FIG. 1 is a schematic diagram for explaining the manufacturing process of this invention. Referring to FIG. 1 and FIG. 2, numeral 1 denotes a substrate. According to this invention, an organic polymer and a ferromagnetic substance are deposited, by a dual simultaneous vapor deposition process, on this substrate to form a magnetic layer. For explaining the present invention, co-ordinate axes are so set as shown in FIG. 1. Namely, an X axis and a Y axis which cross at right angles are set along the surface of the substrate 1, and a Z axis passing through the crossing point O of axes X, Y is so set as to be normal to the surface of the substrate, 1. X' and Y' are axes extending on negative sides of the X axis and the Y axis, respectively, from the crossing point O.

According to the process of this invention, a beam of an organic polymer is irradiated on the substrate at a high incident angle from a direction A as illustrated, and simultaneously therewith a beam of a ferromagnetic substance is irradiated on the substrate 1 from a direction different from the foregoing A direction.

Here, the incident angle $\psi_1$ of the organic polymer is an angle made between the OZ axis and the A direction of the incident beam of the organic polymer, and the present invention is characterized in that this incident angle $\psi_1$ is in the range of $60° < \psi_1 90°$.

The incident beam of the ferromagnetic substance irradiated on the substrate 1 simultaneously with the incident beam of the organic polymer is irradiated from any desired direction that does not overlap with the incident beam of the organic polymer irradiated at the foregoing high incident angle.

By setting an incident direction of the ferromagnetic substance in relation to an incident direction of the organic polymer so as to have a predetermined relationship therebetween, the direction of the easy magnetic axis of the composite magnetic layer formed by the dual simultaneous vapor deposition process can be controlled at will.

Though explained in detailed in conjunction with the experimental examples described hereinafter, in a case where simultaneously with the incidence of the organic polymer irradiated from the A direction existing in a plane P formed by the axes of OX and OZ, the ferromagnetic substance is irradiated on the substrate 1 from a B direction existing in a plane P' formed by the axes of OX' and OZ; namely, in a case where the ferromagnetic substance is so irradiated as to be opposite to the incident direction of the organic polymer and to fall in a plane normal to the substrate and that contains the incident direction of the organic polymer, the magnetic layer formed thereby has an easy magnetic axis in a direction perpendicular to the surface of the substrate 1. Also in a case where, in relation to the same incident direction of the organic polymer as above, the ferromagnetic substance is irradiated from one direction existing in a plane formed by the axes of OY' and OZ, that is, from a C direction, for instance, as illustrated, the composite magnetic layer has a magnetic easy axis in a direction perpendicular to the surface of the substrate. On the other hand, in a case where the ferromagnetic substance is irradiated from a D direction in the P plane as if it were to chase after the incident direction A of the organic polymer, the composite magnetic layer has an easy magnetic axis in a direction parallel to the surface of the substrate 1.

Based on these facts, according to the present invention, it is noted that there is formed selectively either a magnetic layer having a perpendicular magnetic anisotropy or one having an in-plane magnetic anisotropy. A general condition for forming selectively these magnetic layers is as follows. Namely, taking plane P formed by the axes of OX and OZ and including the incident direction A of the organic polymer, a region obtained by turning this plane P about the OZ axis by ±45° from the OX direction is assumed to be M. In general, where the incident beam of the ferromagnetic substance is brought to be irradiated from any direction outside the region M, there can be obtained the magnetic layer having a perpendicular magnetic anisotropy. In this case the incident angle $\psi_2$ of the ferromagnetic substance in relation to the substrate is in the range of $0° \leq \psi_2 \leq 90°$. The incident beam of the ferromagnetic substance for obtaining a magnetic layer having the in-plane magnetic anisotropy lies within the foregoing region M.

To obtain a composite thin film having magnetic anisotropy, the incident angle $\psi_1$ of the organic polymer is in the range of $60° < \psi_1 \leq 90°$. In any case, however, if the incident angle thereof exceeds 80°, the efficiency of the vapor deposition is lowered. Accordingly, although the composite thin film having the magnetic anisotropy can be obtained even at an incident angle of beyond 80°, it is preferable from the viewpoint of productivity that the range of the incident angle be limited to $60° < \psi_1 \leq 80°$.

The organic polymer may be irradiated from a plurality of directions. However, it is essential that each of the incident beams of the plurality of organic polymers should fall in the foregoing high incident angle range. In this case, the relation of the incident direction thereof with the incident direction of the ferromagnetic substance may be determined by its relation with a vectorial composite direction considering the intensity and the direction of the plurality of incident beams of the organic polymer(s).

By the manufacturing process according to the present invention, the fine particles of the ferromagnetic substance in the composite film are mixed with the organic polymer, so that the composite film is made high in chemical corrosion resistance and strong in adhesion strength thereof to the substrate. Thus, there results a magnetic recording medium which is also excellent in mechanical durability.

The term "organic polymer" is used herein to include not only synthetic resin polymers, but also monomers or oligomers to be produced by polymerization thereof into organic polymers. Namely, the same may be, for instance, ultraviolet ray, electron ray or polymerization catalyst hardened resins such as monomers or oligomers such as hydroxyethyl acrylate, hexanediol diacrylate, neopentylglycol diacrylate, methyl-α-chloroacrylate, trimethylolpropane triacrylate, dipentaol hexaacrylate, trimethylol propane tridiethyleneglycol acrylate, urethane acrylate, adipic acid hexamethylenediamineoligomer, etc. or synthetic resins such as polytetrafluoroethylene, polyethylene terephthalate, polycarbonate, polyparaxylene, polypropylene, polyethylene, polystyrene, trifluorochloroethylene, allyl trifluoroacetylene, silicone oil or the like.

As for the ferromagnetic substance, the same may be, for instance, a ferromagnetic single element such as Co, Fe, Ni or the like, a magnetic alloy such as Co-Fe, Co-Ni, Fe-Ni, Co-Fe-Ni, Co-Cu, Co-Au, Co-Cr, Co-Mn, Co-V, Co-Pt, Fe-Cu, Fe-Au, Fe-Mn, Fe-Cr, Fe-Si, Ni-Cu, Co-rare earth metal, Fe-rare earth metal, Mn-Bi, Mn-Sb, Mn-Al or the like, a ferrite compound such as $Fe_3O_4$, Ba ferrite, Sr ferrite, or a ferromagnetic compound such as $Fe_4N$, $Fe_8N$ or the like.

The substrate is made of a non-magnetic material, and the material thereof may be, for instance, a plastic such as polyethylene terephthalate, polyimide, polyvinyl chloride, cellulose triacetate, polycarbonate, polyethylene naphthalate; an inorganic material such as glass, a ceramic or the like; or a metallic material such as Al, Al-Mg, Cu, silicon wafer of the like. A shape of the substrate may be properly selected from film, sheet, tape, disc, drum or the like in accordance with the intended use thereof.

A typical embodiment of the present invention is a process for manufacturing the foregoing binary system composite film comprising the organic polymer and the ferromagnetic substance, but the magnetic recording medium may also be a ternary system wherein an additive such as a lubricant, antistatic agent or the like is mixed therewith, as a third component, by the simultaneous deposition process.

Next, an example of an embodiment of this invention wherein the foregoing binary system composite thin film is manufactured by a dual simultaneous vapor deposition process will be explained with reference to FIG. 2.

Referring to FIG. 2, numeral 10 denotes a bell jar, that is, a vacuum treatment container for a treatment apparatus. The bell jar 10 is connected through an opening 11 made through one side wall thereof to a vacuum pump for high vacuum evacuation (not illustrated). A holding member 12 holding the substrate 1 so that the same will be in a horizontal position to face downwards is disposed at an upper portion of the interior thereof. The foregoing construction is not different from that of a conventional apparatus. According to this invention, however, a heating evaporation crucible container 13 of the resistance heating type which contains the organic polymer A is disposed at a position which is on one side of the substrate 1 and obliquely below the same so that its center axis is so inclined that the incident angle $\psi_1$ of an incident beam a thereof will be, for example, 80° to the direction normal to the surface of the substrate 1. Another heating evaporation container 14 of an electron beam gun (not illustrated) heating type which contains the ferromagnetic material B is so disposed at a position which is on the other side of the substrate 1 and obliquely below the same so that the incident angle $\psi_2$ of an incident beam b thereof will be, for example, 30° to the direction normal to the surface of the substrate 1. The two incident beams a, b may be simultaneously brought to be concentrated on one point of the surface of the substrate 1 for providing thereon a composite magnetic thin film comprising a mixture of the substances A, B having a perpendicular magnetic anisotropy. The heating system for evaporating the substances A, B is not limited to the foregoing type.

Additionally, facilities for cooling and heating the substrate 1 may be provided so that the substrate may be heated or cooled as desired. Thus, it is preferable that the temperature of the substrate 1 be adjusted depending on the kind of the organic polymer to be deposited thereon.

The dual simultaneous vapor deposition process of this invention is not limited to the foregoing vapor deposition process, and the composite film, which is the object of this invention, may be formed by any desired process other than the foregoing vapor deposition process as long as the process is such that the ferromagnetic substance and the organic polymer are deposited, under a vacuum condition, on the substrate in the form of vapor or ionized vapor. As for a process other than a vapor deposition process, there may be mentioned, for instance, a sputtering process (an ion beam sputtering process), an ion plating process, a cluster ion beam process, etc.

The above explanation has been made with respect to an example in which the two kinds of substances are deposited on a substrate 1 where the substrate is stationarily held, a modification can be considered wherein they are deposited on a substrate in the form of a drum or a disc which is held in a rotary position, or on a substrate in the form of a tape which is held in a horizontal or inclined position and is continuously movable in its lengthwise direction.

Next, a process for manufacturing a magnetic recording medium of this invention, using the foregoing apparatus, will be explained more specifically.

EMBODYING EXAMPLE 1

An aluminum disc was used for the substrate 1 in the bell jar 10 of the foregoing apparatus, and the temperature thereof was so controlled by cooling as to be kept constant at $-180°$ C. by a coolant passed through the holding member 12. Polyethylene terephthalate was used for the organic polymer A, and Co was used for the ferromagnetic substance B. The incident angle $\psi_1$ of the incident beam a of the organic polymer A was set at 80°, and the incident angle $\psi_2$ of the incident beam b of the ferromagnetic material B was set at 32°. The pressure during the vapor deposition was kept at $4.0 \times 10^{-6}$ Torr, and the incident beams of the two substances A, B were simultaneously irradiated on the surface of the substrate 1 in the common incident plane from mutually opposite directions. Thus by deposition of the vapors there was formed on the substrate 1 a binary system composite thin film 10000 Å in thickness. The magnetic property in the direction normal to the surface of the composite thin film of the magnetic disc produced is shown in the following Table 1.

TABLE 1

| Saturation magnetic flux density | Coercive force | Squareness ratio |
|---|---|---|
| 4 $\pi$Ms 3200 gauss | Hc $\perp$ 1000 Oe | (Mr*/Ms) $\perp$ 0.93 |

Here, "Mr*" means a residual magnetization which results from demagnetizing field compensation.

Figure 3:
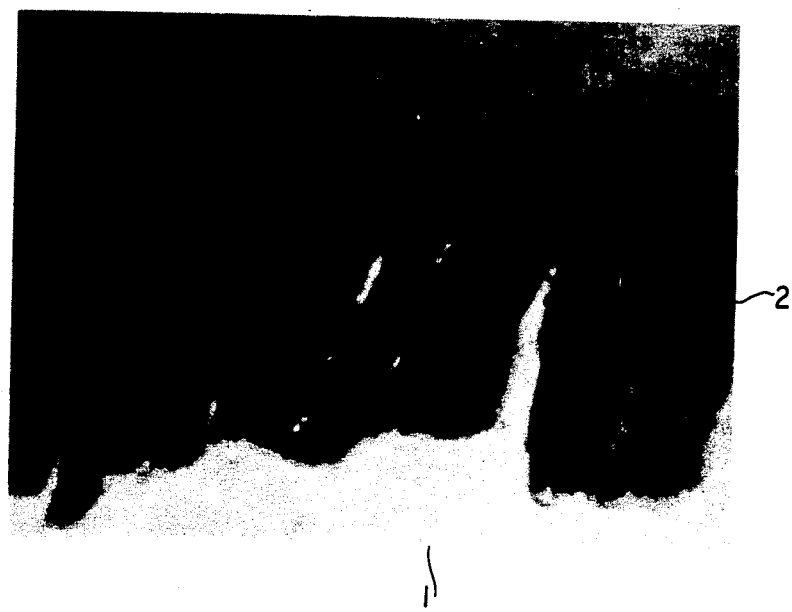
FIG. 3 is an electron micrograph showing a cross-sectional structure of a portion of a product of this invention.

As is clear from the above Table, the composite film exhibits a good perpendicular anisotropy. It has been found from observation of the cross-sectional structure of this composite film through a transmission electron microscope that, as shown in the attached photograph at 50,000 magnification (FIG. 3), composite column 2 of the polyethylene terephthalate and the Co grows vertically in relation to the substrate 1.

EMBODYING EXAMPLE 2

By almost the same manner as that in Embodying Example 1, a composite film of polyethylene terephthalate and Co having a perpendicular magnetic anisotropy was formed. In this case, however, a polyimide film was used for the substrate, and the substrate temperature was room temperature. The pressure during the vapor deposition was $5 \times 10^{-6}$ Torr. The thickness of the composite film formed by deposition of the vapors was 7000 Å. The magnetic property in the direction normal to the film surface of the resultant composite film produced is as slown in the following Table 2.

TABLE 2

| Saturation magnetic flux density | Coercive force | Squareness ratio |
|---|---|---|
| 4 $\pi$Ms 5000 gauss | Hc $\perp$ 750 Oe | (Mr*/Ms) $\perp$ 0.87 |

EMBODYING EXAMPLE 3

The substrate, the temperature thereof, the organic polymer, the ferromagnetic substance, the position of the organic polymer and the incident angle $\psi_1$ of the incident beam thereof were substantially equal to those in Embodying Example 1, but the ferromagnetic substance is so positioned that the incident beam thereof lies in an incident plane crossing at right angles with the incident plane in which the incident beam of the polyethylene terephthalate lies, and the incident angle was set at 33°. The pressure during the vapor deposition was kept at $3.0 \times 10^{-6}$ Torr. Thus, a composite thin film deposited on the substrate was formed having a thickness 8500 Å. The magnetic property in the direction normal to the film surface of this composite film is shown in the following Table 3.

TABLE 3

| Saturation magnetic flux density | Coercive force | Squareness ratio |
|---|---|---|
| 4 $\pi$Ms 4700 gauss | Hc $\perp$ 800 Oe | (Mr*/Ms) $\perp$ 0.87 |

As is clear from the above Table, the composite magnetic film exhibits a perpendicular anisotropy.

EMBODYING EXAMPLE 4

The substrate, the temperature thereof, the organic polymer and the ferromagnetic substance, the position of the organic polymer and the incident angle $\psi_1$ of the incident beam thereof were substantially equal to those in Embodying Example 1. However, the ferromagnetic substance was positioned on the same side with the organic polymer, and the incident beam thereof fell in the incident plane including the incident beam of the organic polymer, and the incident angle was set at 68°. The pressure during the vapor deposition was kept at $5.5 \times 10^{-6}$ Torr. The film thickness of the composite film formed by the simultaneous vapor deposition of the two materials was 4500 Å. The magnetic property in the longitudinal direction of the film surface of the polyethylene terephthalate - Co composite film thus obtained is shown in the following Table 4.

TABLE 4

| Saturation magnetic flux density | Coercive force | Squareness ratio |
|---|---|---|
| 4 $\pi$Ms 9800 gauss | Hc 800 Oe | (Mr/Ms) 0.75 |

As is clear from the above Table 4, this composite magnetic film exhibits an in-plane magnetic anisotropy.

EMBODYING EXAMPLE 5

In almost the same manner as that in Embodying Example 1, except that polytetrafluoroethylene was used for the organic polymer and the pressure was set at $4.5 \times 10^{-6}$ Torr, a composite film of polytetrafluoroethylene - Co was formed. The composite film thickness was 8700 Å.

The magnetic property in the direction normal to the film surface of the composite film is as shown in the following Table 5.

TABLE 5

| Saturation magnetic flux density | Coercive force | Squareness ratio |
|---|---|---|
| 4 $\pi$Ms 5000 gauss | Hc $\perp$ 850 Oe | (Mr*/Ms) $\perp$ 0.90 |

As is clear from the above Table, the composite magnetic film exhibits a good perpendicular anisotropy.

Next, the significance of limiting the incident angle $\psi_1$ of the organic polymer of this invention to the range of $60° < \psi_1 \leq 90°$ will be made clear from the following comparative experimental example.

COMPARATIVE EXPERIMENTAL EXAMPLE

Figure 4:
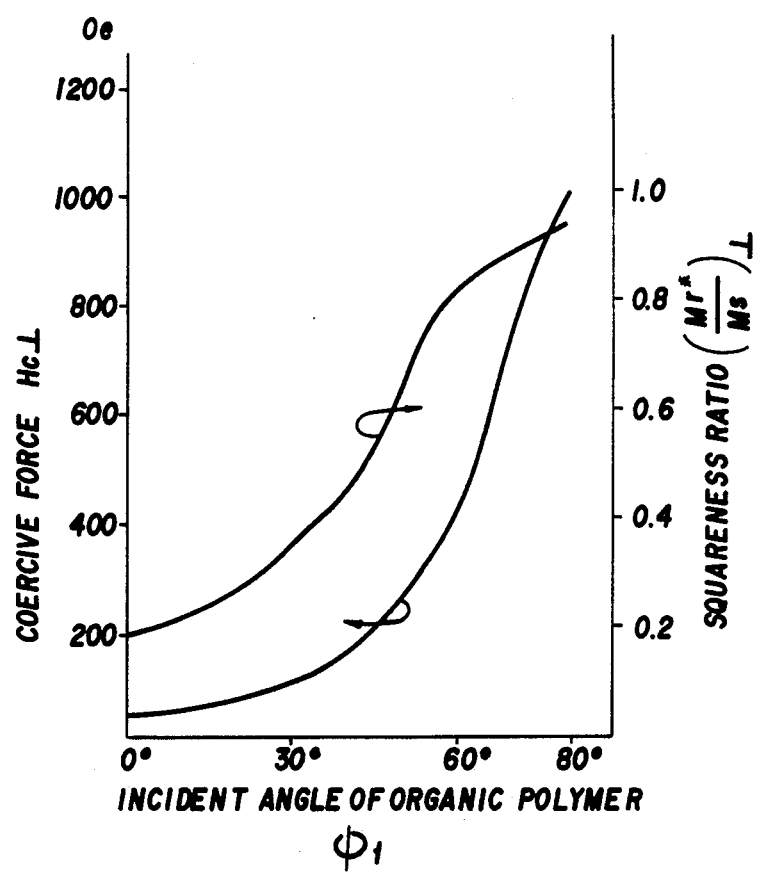
FIG. 4 is a diagram of relative characteristic curves showing the magnetic property of the composite thin film versus the change of incident angles of an incident beam of an organic polymer.

The substrate, the temperature thereof and the organic polymer and the ferromagnetic substance were substantially equal to those in Embodying Example 1. Additionally, the arrangements of the incident planes and the incident directions of the two incident beams, the incident angle $\psi_2$ of the incident beam of the ferromagnetic substance, and the pressure during the vapor deposition were also the same as those in Embodying Example 1. However, the incident angle $\psi_1$ of the incident beam of the organic polymer, that is, polyethylene terephthalate, was changed variously within a range of $0° \leq \psi_1 \leq 80°$, and thereby various composite films having various film thicknesses in the range of 8000–10000 Å and various saturation magnetic flux densities in the range of 3000–4000 gauss were formed on respective substrates. Each of the products was measured in respect of coercive force Hc and squareness ratio in the direction normal to the film surface thereof. The measured results thereof are as shown in FIG. 4. As will be clear therefrom, in cases where the incident angle $\psi_1$ of the incident beam of the organic polymer is below 60°, the coercive force decreases rapidly, and the squareness ratio lowers remarkably, and thus the perpendicular magnetic anisotropy of the composite films is extremely lowered. Accordingly, in other words, it has been confirmed that it is not effective in increasing the magnetic anisotropy to set the incident angle $\psi_1$ of the organic polymer at such a low incident angle range of $0° \leq \psi_1 \leq 60°$. If, on the contrary, the incident angle $\psi_1$, thereof is set at a high incident angle exceeding 60° according to the characteristic feature of this invention, the coercive force thereof can be sharply increased and the squareness ratio can be extremely improved.

The magnetic recording medium comprising the composite film of the organic polymer and the ferromagnetic substance manufactured by any of the foregoing embodying examples of this invention may be thereafter treated, when a mechanical strength thereof is required using a procedure where the organic polymer is further polymerized by adding to the depositing film a polymerization initiator, that is, a polymerization catalyst by a vapor deposition process or by irradiating the film with an ultraviolet ray or electron ray, so that the organic polymer of the composite film is formed into a hardened and higher molecular weight polymer. In a case where the material of the organic polymer is a monomer or oligomer, it is necessary that the resultant composite magnetic film is subjected to the polymerization treatment by applying to the film a catalyst u.v. rays or electron rays. As a catalyst, there may be used any known catalyst such as diacyls such as acetyl peroxide, benzoxyl peroxide, etc.

Thus, according to this invention, when a magnetic recording medium comprising a composite film of an organic polymer and a ferromagnetic substance is formed on a surface of a substrate, an incident angle of an incident beam of the organic polymer is set within a range of $60° < \psi_1 \leq 90°$, and the incident beam of the ferromagnetic substance is so set as to be in a desired incident plane and at a desired incident angle but so as not to overlap the incident beam of the organic polymer. The two beams are simultaneously irradiated on the surface of the substrate, so that there can be obtained a high density magnetic recording medium comprising a composite film having a large magnetic anisotropy in the direction normal or parallel to the surface of the magnetic film and also having a high coercive force and an extremely improved squareness ratio. Additionally, the magnetic recording layer comprises a mixture of the organic polymer and the ferromagnetic substance so that there can be obtained a magnetic recording medium which is excellent in both mechanical durability and chemical corrosion resistance.

I claim:

1. A process for manufacturing a magnetic recording medium comprising simultaneously irradiating an incident beam of an organic polymer and an incident beam of a ferromagnetic substance to impact onto a surface of a substrate, the incident beam of the organic polymer being irradiated onto the surface of the substrate at any desired incident angle $\psi_1$ in a range of $60° < \psi_1 < 90°$, and at the same time the incident beam of the ferromagnetic substance being irradiated on the surface of the substrate so as to intersect the incident beam of the organic polymer at the point of impact of both beams with the surface of the substrate, to form a composite film of the ferromagnetic substance and the organic polymer on the surface of the substrate.

2. A process as claimed in claim 1, wherein the incident beam of the organic polymer and the incident beam of the ferromagnetic substance are simultaneously irradiated on the surface of the substrate along a common incident plane and from mutually opposite directions, the incident angle $\psi_2$ of the incident beam of the ferromagnetic substance being set so as to be in the range of $0° \leq \psi_2 \leq 90°$ to form an organic polymer-ferromagnetic substance composite thin film having a perpendicular magnetic anisotropy on the surface of the substrate.

3. A process as claimed in claim 1, wherein the incident beam of the organic polymer and the incident beam of the ferromagnetic substance are simultaneously irradiated onto the surface of the substrate along respective incident planes which cross at right angles with one another, from respective directions crossing one another, the incident angle $\psi_2$ of the incident beam of the ferromagnetic substance being in the range of $0° \leq \psi_2 \leq 90°$ so that an organic polymer ferromagnetic substance composite thin film having a perpendicular magnetic anisotropy is formed on the surface of the substrate.

4. A process as claimed in claim 1, wherein the incident beam of the organic polymer and the incident beam of the ferromagnetic substance are simultaneously irradiated onto the surface of the substrate along a common incident plane or along incident planes adjacent one to another, from respective directions on the same side, the incident angle $\psi_2$ of the incident beam of the ferromagnetic substance being in the range of $0° \leq \psi_2 \leq 90°$ so that an organic polymer-ferromagnetic substance composite thin film having an in-plane magnetic anisotropy is formed on the surface of the substrate.

5. A process as claimed in claim 1, wherein the incident angle $\psi_1$ of the organic polymer is in the range of $60° < \psi_1 \leq 80°$.

6. A process as claimed in claim 2, wherein the incident angle $\psi_1$ of the organic polymer is in the range of $60° < \psi_1 \leq 80°$.

7. A process as claimed in claim 3, wherein the incident angle $\psi_1$ of the organic polymer is in the range of $60° < \psi_1 \leq 80°$.

8. A process as claimed in claim 4, wherein the incident angle $\psi_1$ of the organic polymer is in the range of $60° < \psi_1 \leq 80°$.

* * * * *